US012633665B2

(12) United States Patent
Mongrenier

(10) Patent No.: US 12,633,665 B2
(45) Date of Patent: May 19, 2026

(54) WIRELESS COMMUNICATION DEVICE COMPRISING A PLURALITY OF ANTENNAS, ASSOCIATED FACILITY AND COMMUNICATION METHOD

(71) Applicant: BIOLOG-ID, Bernay (FR)

(72) Inventor: Jean-Claude Mongrenier, Aix en Provence (FR)

(73) Assignee: BIOLOG-ID, Bernay (FR)

( * ) Notice: Subject to any disclaimer, the term of this patent is extended or adjusted under 35 U.S.C. 154(b) by 228 days.

(21) Appl. No.: 18/557,604

(22) PCT Filed: Apr. 27, 2022

(86) PCT No.: PCT/EP2022/061142
§ 371 (c)(1),
(2) Date: Oct. 27, 2023

(87) PCT Pub. No.: WO2022/229242
PCT Pub. Date: Nov. 3, 2022

(65) Prior Publication Data

US 2024/0213676 A1 Jun. 27, 2024

(30) Foreign Application Priority Data

Apr. 27, 2021 (FR) ...................................... 21 04354

(51) Int. Cl.
*H01Q 7/00* (2006.01)
*H01Q 21/24* (2006.01)

(52) U.S. Cl.
CPC ............... *H01Q 7/00* (2013.01); *H01Q 21/24* (2013.01)

(58) Field of Classification Search
CPC ........... G06K 7/10356; G06K 7/10415; H01Q 21/24; H01Q 7/00
See application file for complete search history.

(56) References Cited

U.S. PATENT DOCUMENTS 7,432,874 B2 * 10/2008 Meissner ........... G06K 7/10356 343/742
10,025,960 B1 * 7/2018 Fink .......................... H04L 5/08
11,630,964 B1 * 4/2023 Seitz ..................... G07F 17/322 235/451
2014/0015648 A1 * 1/2014 Murdoch ........... G06K 7/10376 340/10.3

(Continued)

OTHER PUBLICATIONS

Preliminary Search Report dated Dec. 8, 2021 in FR 2104354.

(Continued)

*Primary Examiner* — Thien M Le
(74) *Attorney, Agent, or Firm* — B. Aaron Schulman, Esq.; Stites & Harbison, PLLC

(57) ABSTRACT

The invention relates to a wireless communication device (30) comprising a plurality of antennas (42), each antenna (42) having a single loop (44), the antennas (42) of the plurality of antennas being arranged in groups (46) of four antennas (42), the position of each antenna (42) of the same group being deduced by translation from the position of another antenna (42) of the same group (46), each group (46) of four antennas (42) including only five zones of overlap of antennas of the same group (46): a common zone of overlap (ZC) of the four antennas (42) and four zones of overlap (Z1, Z2, Z3, Z4) of two antennas (42).

21 Claims, 4 Drawing Sheets

(56) References Cited

U.S. PATENT DOCUMENTS

Figure 1:
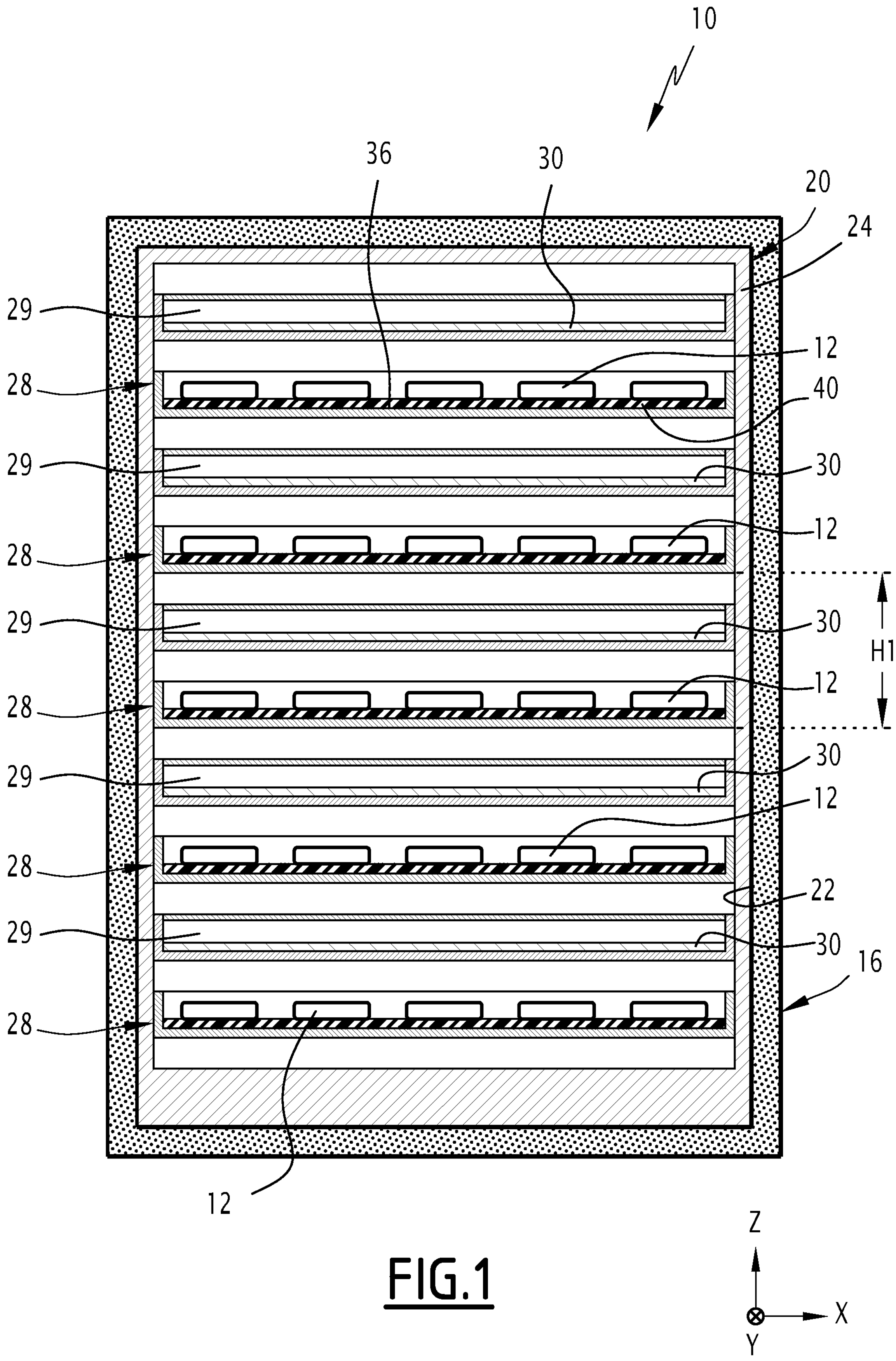

| | | | | |
|---|---|---|---|---|
| 2014/0091640 | A1 | 4/2014 | Scholz et al. | |
| 2019/0148815 | A1* | 5/2019 | Aono | H01Q 1/2283 455/552.1 |
| 2019/0197385 | A1* | 6/2019 | Finn | H04B 5/22 |
| 2019/0220638 | A1 | 7/2019 | Mongrenier | |
| 2020/0050807 | A1* | 2/2020 | Khojastepour | G06K 17/00 |
| 2021/0280984 | A1* | 9/2021 | Tanaka | H01Q 1/38 |
| 2022/0094053 | A1* | 3/2022 | Jiang | H01Q 5/42 |
| 2024/0079782 | A1* | 3/2024 | Rush | H01Q 1/243 |

OTHER PUBLICATIONS

International Search Report dated Jul. 21, 2022 in PCT/EP2022/061142.
Written Opinion dated Jul. 21, 2022 in PCT/EP2022/061142.

* cited by examiner

WIRELESS COMMUNICATION DEVICE COMPRISING A PLURALITY OF ANTENNAS, ASSOCIATED FACILITY AND COMMUNICATION METHOD

The present invention relates to a wireless communication device. The invention further relates to an installation for storing elements, comprising such a wireless communication device. The invention further relates to a communication method.

In the field of element logistics, many special systems have been developed for detecting the presence or the absence of elements e.g. stored on a shelf.

The elements generally include an identifying label, such as an RFID (radio frequency identification) label, affixed to one face of the element. Each label stores information about the corresponding element. Furthermore, the systems comprise a reader, such as an RFID reader, in order to read and/or update the information contained in the labels of said elements and also to detect the presence or the absence of the elements.

However, it has been found that such systems do not ensure a reliable reading of all stored elements. Indeed, labels located on certain zones of the shelf cannot be detected and/or read by the RFID readers.

However, when the stored elements are pouches containing biological substances, such as blood substances (pouches with primary blood, plasma, platelets, red blood cells, etc.) or cellular engineering substances (cells, strains, etc.), or further pouches of medicines, such as chemotherapy pouches, it is essential to ensure a detection, a reading and/or an updating of all labels on the pouches, in order to ensure proper traceability of blood substances.

Therefore, there is a need for a communication device which gives a reliable reading of each label.

To this end, the subject matter of the present description is a wireless communication device comprising a plurality of antennas, each antenna having a single loop, the antennas of the plurality of antennas being arranged in groups of four antennas, the position of each antenna in the same group being deduced by translating the position of another antenna in the same group, each group of four antennas having only five zones of overlap for antennas of the same group: one zone of overlap common to the four antennas and four zones of overlap of two antennas.

According to particular embodiments, the wireless communication device comprises one or a plurality of the following features, taken individually or according to all technically possible combinations:

- each antenna of the plurality of antennas has a loop surface and the common zone of overlap of each group has a surface, the ratio between the surface area of the loop surface of each antenna and the surface area of the surface of common zone of overlap of each group is comprised between 20 and 35.
- each antenna of the plurality of antennas has a first dimension along a first direction and a second dimension in a second direction perpendicular to the first direction, the common zone of overlap of each group comprising a first dimension along the first direction and a second dimension along the second direction, the ratio between the first dimension of each antenna and the first dimension of the zone of overlap common to each group being 4 to 10 and the ratio between the second dimension of each antenna and the second dimension of the common zone of overlap being comprised between 1.5 and 6.

- each zone of overlap of two antenna comprises a first dimension along the first direction and a second dimension along a second direction perpendicular to the first direction and each antenna of the plurality of antennas has a first dimension along the first direction and a second dimension along the second direction, the ratio between the first dimension of each antenna and the first dimension of each zone of overlap of two antennas being comprised between 1.1 and 1.5 or between 4 and 10 and the ratio between the second dimension of each antenna and the second dimension of each zone of overlap of two antennas being comprised between 1.1 and 8.
- each group has a first antenna, a second antenna, a third antenna and a fourth antenna and the position of each antenna of a group is deduced by translation along a first direction of another antenna of the group or by translation along a second direction of the position of another antenna of the group, the second direction being perpendicular to the first direction.
- the antennas of the plurality of antennas are identical, the device comprising at least fifteen antennas.
- the wireless communication device is a radio identification label reader.
- the wireless communication device comprises an electric power generator configured for supplying electric power simultaneously to the plurality of antennas of the communication device.
- the antennas of the plurality of antennas of the communication device are arranged in a plurality of groups of four antennas.

The present description further relates to an installation for storing elements, each element supporting a first communication unit, the installation comprising an chamber comprising an internal compartment, the chamber preferentially being a refrigerating chamber, and a system for storing elements, comprising a communication device as described hereinabove, forming a second wireless communication unit apt to communicate with the first communication units wherein the element storage device is arranged in the internal compartment.

According to a particular embodiment of the storage installation, the elements of the plurality of elements are containers of biological substances, medicines or therapeutic preparations and wherein each first wireless communication unit being a radio identification label comprising a memory suitable for storing data relating to the element supporting the first wireless communication unit.

The present description further relates to a communication method implemented in an installation for storing elements, as described hereinabove between at least a first wireless communication unit and a second wireless communication unit, wherein the communication method comprises a step of emitting waves by the second wireless communication unit.

According to a particular embodiment of the communication method, the communication method comprises a step of supplying electric current simultaneously to the plurality of antennas of the second wireless communication unit.

Figure 2:
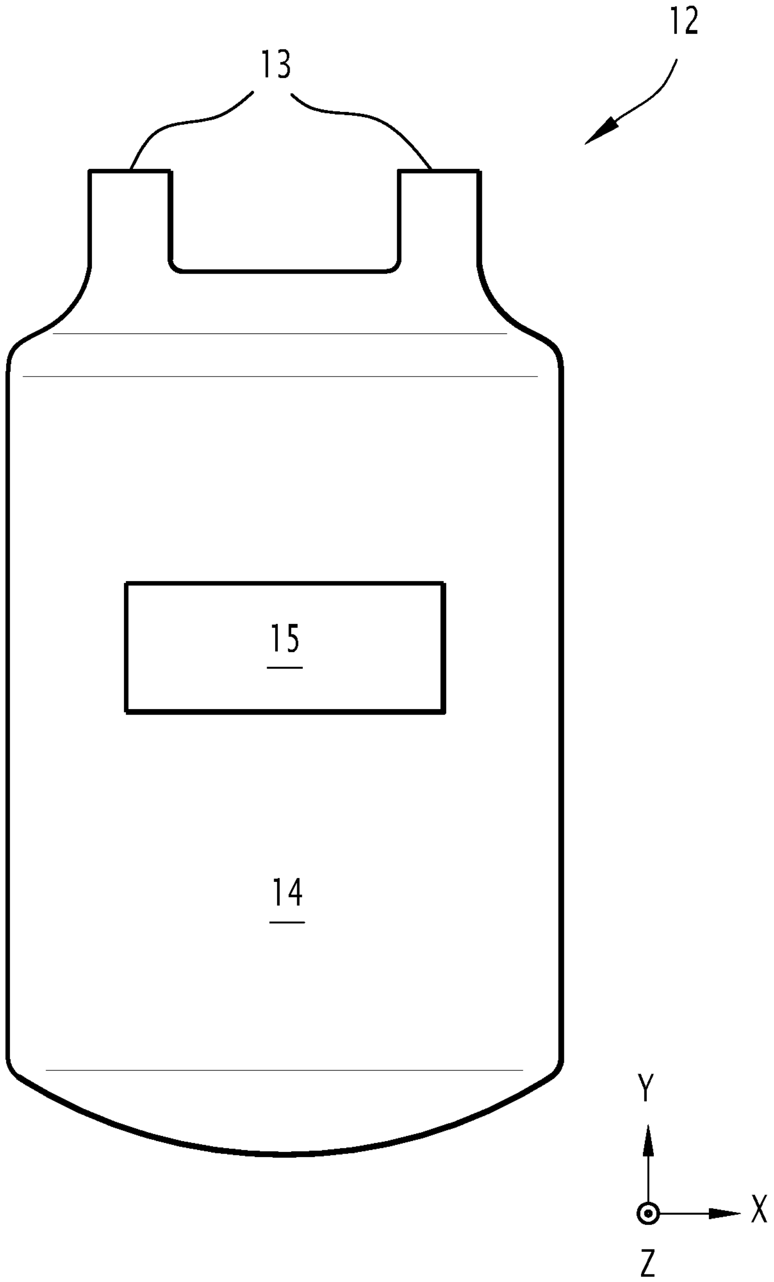
Figure 3:
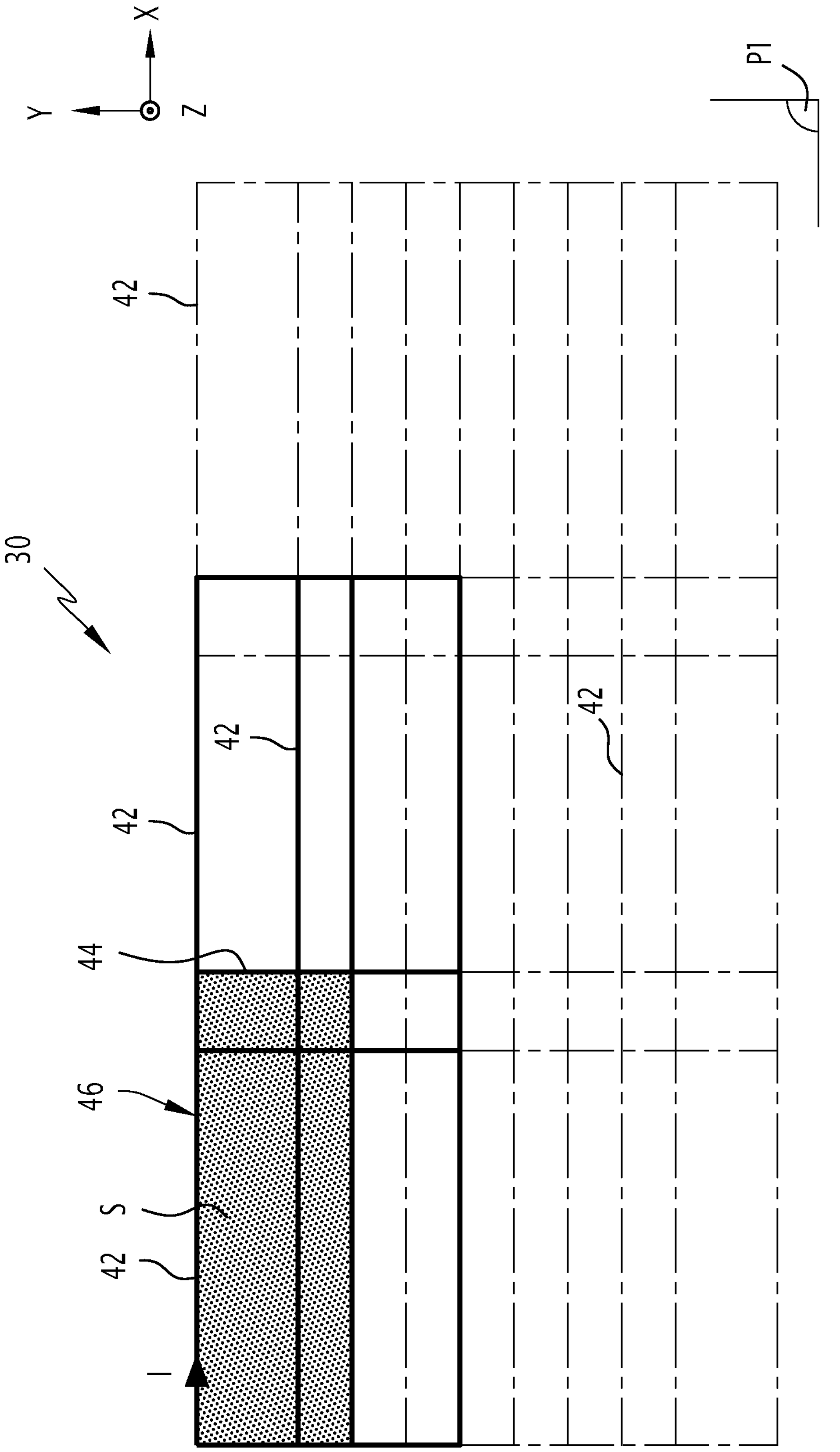
Figure 4:
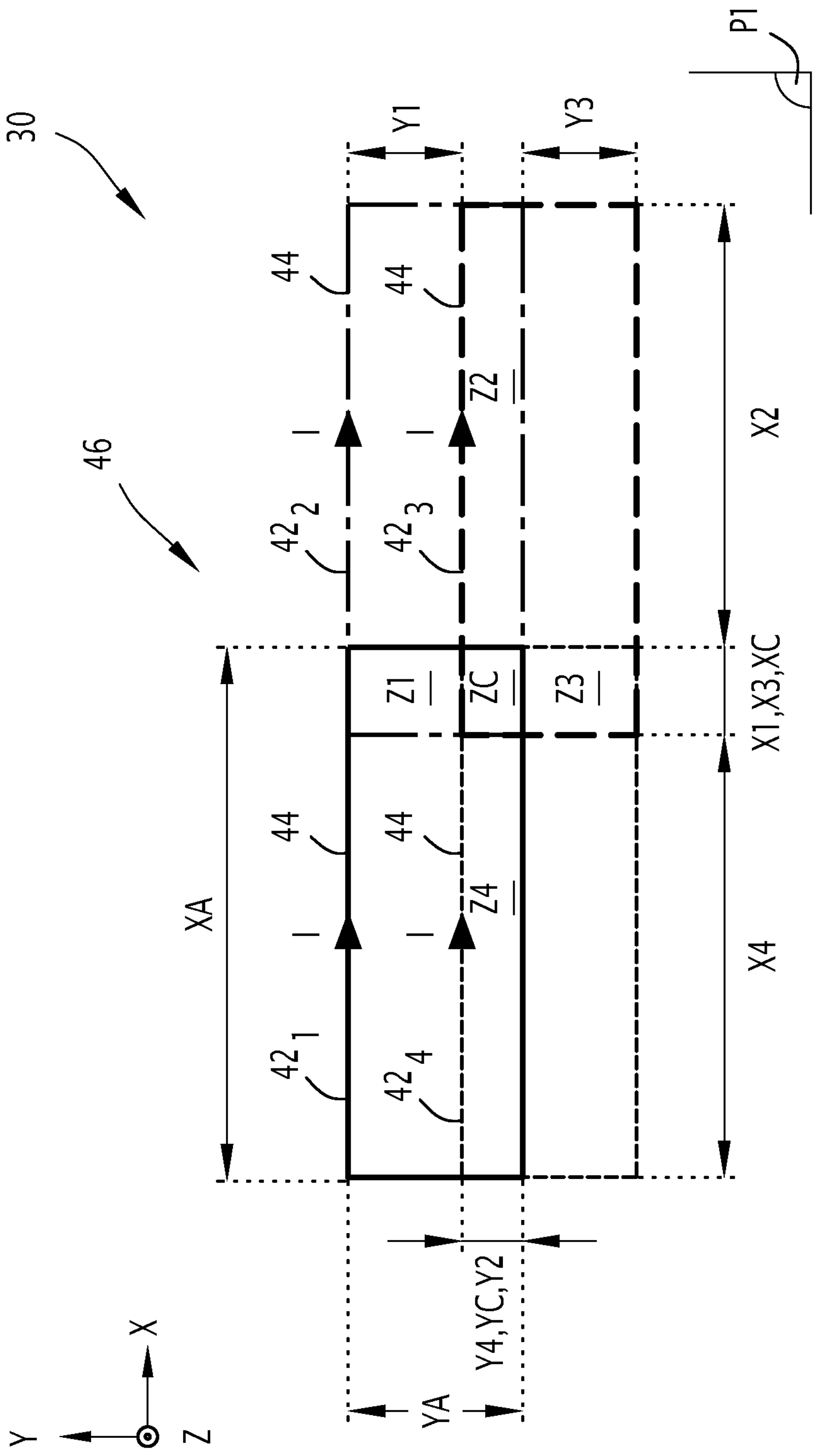

Other features and advantages of the invention will appear upon reading hereinafter the description of one embodiment of the invention, given only as an example, and making reference to the following drawings:

FIG. 1, a schematic perspective view of an installation comprising a system for storing elements, FIG. 2, a schematic representation of an element, FIG. 3, a schematic representation of another wireless communication device, FIG. 4, a schematic representation of a part of the wireless device shown in FIG. 3.

An installation 10 for storing elements 12 is shown in FIG. 1.

The installation 10 has e.g. the role of maintaining each element 12 at a predefined temperature and/or of agitating each element 12.

A longitudinal direction is defined in the present description. The transverse direction is represented by the oriented axis X and, hereinafter in the description, is referred to as "transverse direction X". The transverse direction X is oriented along the direction of the transverse axis X.

A longitudinal direction perpendicular to the transverse direction X is also defined. The longitudinal direction is represented by an oriented axis Y and, hereinafter in the description, is referred to as "longitudinal direction Y". The longitudinal direction Y is oriented along the direction of the longitudinal axis Y.

A vertical direction perpendicular to the transverse direction X and to the longitudinal direction Y is also defined. The vertical direction is represented by an oriented axis Z and, hereinafter in the description, being referred to as "vertical direction Z". The vertical Z direction is oriented along the direction of the vertical axis Z.

Furthermore, the dimension of an object of the installation 10 measured along the transverse direction X is hereinafter referred to as "width". The dimension of an object of the installation 10 measured along the longitudinal direction Y is called "length". The dimension of an object in installation 10 measured along the vertical direction Z is called "height".

Furthermore, hereinafter in the description, the suffix "A" is used in a reference to signify that the reference relates to an antenna of the communication device described hereinbelow. Furthermore, the suffix "C" is used in a reference to signify that the reference refers to a common zone of overlap of a group of four antennas of the communication device described hereinbelow.

With reference to FIG. 2, the elements 12 are, according to the example described, containers. In general, a container refers to any type of pouch intended for containing substances the use of which is conditioned by strict storage requirements.

More particularly, the elements 12 are e.g. pouches containing biological substances such as blood substances (pouches with primary blood, plasma, platelets, red blood cells, etc.) or cellular engineering substances (human or animal cells, in particular human or animal stem cells, substances coming from human or animal cells).

In a variant, the elements 12 are pouches with pouches of medicines or therapeutic preparations, containing one or a plurality of active ingredients or drugs, such as chemotherapy pouches generally containing a solute and one or a plurality of chemotherapy active ingredients.

More generally, the elements 12 are suitable for containing any substance intended for being infused into a human or an animal.

According to the example considered, each container 12 is a pouch intended, in the present case, for containing plasma.

In a known manner, such a container 12 is a plasma-tight container made of a breathable plastic material making metabolism possible, such as PVC (polyvinyl chloride), polycarbonate or PEG (polyethylene glycol) type.

The container 12 includes tubes 13 which are closed off, e.g. by welding.

The tubes 13 were used, before being closed, for inserting the plasma into the container 12.

Furthermore, the container 12 has two large faces 14 (only one face is visible in FIG. 2).

In FIG. 2, the container 12 is arranged horizontally, i.e. the two large faces 14 thereof are substantially normal to the vertical direction Z.

Each container 12 comprises a first wireless communication unit 15. Each first wireless communication unit 15 is hereinafter denoted by "first communication unit 15".

Each first communication unit 15 is e.g. a label such as an adhesive label affixed to an outer wall of the element. More particularly, the adhesive label is affixed to one of the large faces 14 of the container 12.

In general, each first communication unit 15 comprises at least one antenna, a memory and, if appropriate, a microprocessor.

The antenna of each first communication unit 15 is e.g. a radiofrequency antenna and is known as an RFID label.

The memory of each first communication unit 15 comprises information about the corresponding element 12.

Such information is, e.g.: a single identifier of element 12, the storage date of the element 12, the expiry date of the element 12, the date on which the first communication unit 15 of the element 12 first communicated information, the donation number of the content of the element 12, the substance code of the content of the element 12, the rhesus group of the content of the element 12, the blood phenotype of the substance of the element 12, the identity of the patient from whom the content of the element 12 originates, the name of the patient from whom the contents of the element 12 originates, the substance of the contents of the element 12, the donation center (including the address) where the contents of the element 12 was obtained, the current process of the element 12 and the type of anticoagulant of the contents of the element 12. In the case of a chemotherapy, such information should further comprise the date of manufacture, the type of substance, the identity of the prescribing physician, the identity of the pharmacist, the identity of the manufacturer, the date of release and the status (released, dispensed, etc.).

The installation 10 comprises a chamber 16 and a device 20 for storing elements 12.

The chamber 16 delimits an internal compartment 22 for receiving the storage device 20.

The chamber 16 is e.g. a refrigerating chamber, such as a refrigerator or a freezer. When the refrigerating chamber is a refrigerator, the temperature of the chamber being comprised between 0° C. and 5° C., preferentially equal to 4° C. When the refrigerating chamber is a freezer, the temperature of the chamber is comprised between −35° C. and −96° C., preferentially equal to −40° C.

In a variant, the chamber 16 is a platelet agitator. The chamber 16 is then e.g. integrated into an incubator having a temperature, preferentially equal to 24° C.

In the present description, relative positioning with respect to a current direction of use of the installation 10 is defined. More particularly, a bottom corresponding to the ground and a top opposite the bottom, are defined. Thereby, hereinafter in the application, a first element called "lower" than a second element, is located closer to the ground than the second element. Furthermore a first element called "higher" than a second element, is located farther from the ground than the second element. Such relative positioning is also emphasized by terms such as "below" or "above", "under" or "on" or further "lower" or "upper".

The device 20 for storing elements 12 comprises a support 24 delimiting a housing, at least one rack 28 arranged in the housing, an electrical power supply (not shown in the figures), at least one wireless communication device 30, hereinafter referred to as "second communication unit 30", and at least one communication zone.

The support 24 forms a frame.

For example, the support 24 is made of a material such as plastic suitable for letting through electromagnetic waves.

The storage device 20 comprises a plurality of racks 28, a plurality of satellite boxes 29 and a plurality of second communication units 30.

The support 24 supports the plurality of racks 28 and the plurality of satellite boxes 29.

The racks 28 are stacked along the vertical direction Z.

Furthermore, the racks 28 are mounted so as to be movable in translation along the longitudinal direction Y with respect to the support 24.

The storage device 20 comprises, in the present embodiment, five racks 28. In a variant, the storage device 20 comprises a number of racks 28 greater than five.

Each rack 28 has a bottom 36.

The bottom 36 extends in a plane perpendicular to the vertical direction Z.

Each rack 28 is e.g. made of a metal.

As an illustration, a chock 40 is arranged on the bottom 36 of each rack 28. The chock 40 has a height, e.g. greater than or equal to 6 millimeters (mm).

The elements 12 are arranged horizontally on the chock 40.

For example, each chock 40 is made of plastic.

The communication device comprises e.g, five satellite boxes 29.

A satellite box 29 houses a second communication unit 30, the second communication unit 30 being shown schematically in FIG. 1. Thereby, a satellite box 29 is a case which contains a second communication unit 30.

Each satellite box 29 is arranged above a rack 28.

The height H1 between two racks 28 is equal to 46 mm.

More precisely, the height H1 between two racks 28 corresponds to the distance between a first rack 28 and a second rack 28 situated under the first rack 28.

The power supply is suitable for supplying the second communication units 30 with electric current.

In a variant, each second communication unit 30 comprises a respective power supply configured for supplying the second communication unit 30 with electric current. The above does not change anything in the operation described hereinafter.

In the present case, each second communication unit 30 of a satellite box 29 is suitable for communicating with the first communication units 15 of the elements 12 via the rack 28 located under the satellite box 29.

Thereby, hereinafter in the description, the first communication units 15 supported by a given rack 28 intended for communicating with the second communication unit 30 housed in the satellite box 29 located just above the rack 28 are called "first communication units 15 associated with the second communication unit 30".

Each second communication unit 30 is suitable for communicating with each first communication unit 15 associated with the second communication unit 30 according to a communication protocol, in order to read the data stored in the memory of the first communication unit 15.

For example, the communication protocol is an RFID protocol.

For example, the RFID communication protocol is a communication protocol called an "UHF" protocol. The acronym "UHF" refers to the terminology of ultra-high frequency.

In such a communication protocol, each second communication unit 30 is apt to transmit or receive a signal having a frequency comprised between 300 MHz and 3000 MHz.

For example, the RFID communication protocol is a communication protocol called an "HF" protocol. The acronym "HF" refers to the terminology of high frequency.

In such a communication protocol, each second communication unit 30 is apt to transmit or receive a signal having a frequency comprised between 3 MHz and 30 MHz. According to a particular example, the frequency is equal to 13.56 MHz±7k Hz.

According to an example of embodiment, each second communication unit 30 is suitable for operating both according to the UHF RFID communication protocol and the HF RFID communication protocol.

In particular, each second communication unit 30 is an RFID reader. In other words, each second communication unit 30 is suitable for reading the information stored in each first communication unit 15 associated with the second communication unit 30.

A second communication unit 30 of a satellite box 29 is described hereinafter with reference to FIGS. 3 and 4. Each other second communication unit 30 is analogous to the second communication unit 30 described hereinafter.

The second communication unit 30 comprises a plurality of antennas 42.

For example, the second communication unit 30 comprises at least eight antennas and preferentially at least fifteen antennas 42.

In the present case, the antennas 42 are identical to each other.

Each antenna 42 is e.g. an RFID antenna. In other words, each antenna 42 is apt to emit electromagnetic waves and more precisely radiofrequency waves.

Each antenna 42 has a single loop 44. Furthermore, for each antenna 42, a loop surface S of the loop 44 of the antenna 42 is defined. The loop surface S is identified by small point filling in FIG. 3. For each antenna 44, the surface S of loop 44 of the antenna 44 is referred to hereinafter as the "loop surface".

Each loop 44 of an antenna 42 is suitable for letting flow therethrough a current I delivered by the electrical supply.

The antennas 42 extend in the same plane, denoted by P1. The plane P1 is normal to the vertical direction Z.

For example, each loop 44 has a rectangular shape.

Each antenna 42 has a width denoted by XA. For each antenna 42, the width XA is equal to the width of the loop 44 of the antenna 42.

For example, the width XA is comprised between 115 mm and 135 mm.

Each antenna 42 has a length denoted by YA. For each antenna, the width YA is equal to the width of the loop 44 of the antenna 42.

As an example, the length YA is comprised between 50 mm and 70 mm.

In the present embodiment, the widths XA of each antenna 42 are equal.

Furthermore, the lengths YA of each antenna 42 are also equal.

The antennas 42 of the plurality of antennas are arranged in groups 46 of four antennas 42. In other words, each antenna 42 of the communication unit 30 is part of at least one group 46 of four antennas.

Each second communication unit 30 comprises a plurality of groups of four antennas 42. Thereby, for each second communication unit 30, the antennas 42 of the plurality of antennas of the second communication unit are arranged in a plurality of groups 46 of four antennas 42. In the present context, the expression "arranged in a plurality of groups 46 of four antennae 42" is to be understood as the fact that by distributing the antennae 42, more than one group 46 of four antennae 42 is necessarily formed.

A group 46 of four antennas 42 is shown in FIG. 4 and described hereinafter. Each other group 46 of four antennas 42 is analogous to the group 46 of four antennas described hereinafter.

In the group of four antennas 42, the antennas 42 of the group 46 are called "first antenna $42_1$", "second antenna $42_2$", "third antenna $42_3$" and "fourth antenna $42_4$". In the case where no specific antenna is referred to, the generic term "antenna 42" is used.

For example, the position of each antenna 42 of the same group 46 is deduced by translating the position of another antenna 42 of the same group 46.

In the present case, the geometric shape resulting from the movement of translation of the antennas 42 of the same group 46 forms a rectangle.

Thereby, for the four antennas of the same group 46, the movement of translation comprises e.g., in the following order, a first translation of the first antenna $42_1$ along the transverse direction X and along the transverse direction X in order to obtain the position of the second antenna $42_2$, the translation of the second antenna $42_2$ along the longitudinal direction Y and along a direction opposite to the longitudinal direction Y in order to obtain the position of the third antenna $42_3$ and, finally, the translation of the third antenna $42_3$ along the transverse direction X and along the opposite direction to the transverse direction X in order to obtain the position of the fourth antenna $42_4$.

More precisely, the position of the second antenna $42_2$ is deduced from the translation of the position of the first antenna $42_1$ along the transverse direction X along the direction of the transverse axis X. The distance of the translation is less than the width XA of the first antenna $42_1$.

The position of the third antenna $42_3$ is deduced from the translation of the position of the second antenna $42_2$ along the longitudinal direction Y along the direction opposite to the longitudinal axis Y. The translation distance is less than the length YA of the second antenna $42_2$.

The position of the fourth antenna $42_4$ is deduced from the translation of the position of the third antenna $42_3$ along the transverse direction X along the direction opposite to the transverse axis X. The translation distance is less than the width XA of the third antenna $42_3$.

As can be seen in FIG. 4, the group 46 of four antennas 42 has only five zones of overlap of antennas 42 of the same group 46: a zone of overlap ZC common to the four antennas 42 of the group 46 and four zones of overlap of two antennas 46 of the group 46, denoted by Z1, Z2, Z3 and Z4, respectively.

The common zone of overlap ZC is a zone formed by the joining of the four loop surfaces S of the antennas 42 of the group 46.

The common zone of overlap ZC has a surface, denoted by SC.

The surface area of the surface SC is strictly smaller than the surface area of the surface S of each antenna 42 of the group 46.

As an example, the ratio between the surface area of the loop surface S of each antenna 42 and the surface area of the surface SC of the common zone of overlap ZC is comprised between 20 and 35.

As an illustration, the surface area of the surface SC is comprised between 250 $mm^2$ and 350 $mm^2$. In the present embodiment, the surface area of the surface SC is equal to 300 $mm^2$.

The common zone of overlap ZC has, in the present case, a rectangular shape.

The common zone of overlap ZC has a width, denoted by XC and a length, denoted by YC.

The ratio between the width XA of each antenna 42 of the group 46 and the width XC of the common zone of overlap ZC is comprised e.g. between 4 and 10.

Furthermore, the ratio between the length YA of each antenna 42 of the group 46 and the length YC of the common zone of overlap ZC is comprised e.g. between 1.5 and 6.

As an example, the width XC of the common zone of overlap ZC is comprised between 15 mm and 25 mm. As an illustration, the width XC of the common zone of overlap ZC is equal to 20 mm.

For example, the length YC of the common zone of overlap ZC is comprised between 10 mm and 20 mm. For example, the length YC is 15 mm.

Each zone of overlap of two antennas 42 of a group 46 is formed by the overlap of two distinct antennas of the group 46. More precisely, the zone of overlap of two antennas 42 of the group 46 corresponds to a zone of overlap of the two loops 44 of the antennas 42.

The zones of overlap of two antennas 42 of the group 46 are called "first zone Z1", "second zone Z2", "third zone Z3", "fourth zone Z4". In the case where no specific zone is referred to, the generic term "zone of overlap of two antennas 42" is used.

Each overlap zone of two antennas Z1, Z2, Z3, Z4 comprises a width denoted respectively X1, X2, X3, X4 and a length denoted by Y1, Y2, Y3, Y4, respectively.

In particular, in the example described, the first zone Z1 corresponds to the overlap of the first antenna $42_1$ and of the second antenna $42_2$. The first zone Z1 has a first surface S1.

Furthermore, the second zone Z2 corresponds to the overlap of the second antenna $42_2$ and of the third antenna $42_3$. The second zone Z2 has a second surface S2.

The third zone Z3 corresponds to the overlap of the third antenna $42_3$ and of the fourth antenna $42_4$. The third zone Z3 has a third surface S3.

The fourth zone Z4 corresponds to the overlap of the fourth antenna $42_4$ and of the first antenna $42_1$. The fourth zone Z4 has a fourth surface S4.

The surface area of each surface S1, S2, S3, S4 is smaller than the surface area of the surface S of each antenna 42 of the group 46.

More particularly, for each antenna 42 of the group 46 and each zone of overlap of two antennas Z1, Z2, Z3, Z4 of the group 46, the ratio between the surface area of the surface S of the antenna 42 and the area of the surface S1, S2, S3, S4 of the zone of overlap of two antennas Z1, Z2, Z3, Z4 is comprised e.g. between 2 and 13.

In the present embodiment, the surface area of the first surface S1 is equal to the surface area of the third surface S3. Furthermore, the second surface S2 and the fourth surface S4 are equal.

As an illustration, the ratio between the surface area of the surface S of each loop 44 of the group 46 and the surface area of the first surface S1 and the ratio between the surface area of the surface S of each loop 44 of the group 46 and the surface area of the third surface S3 are each comprised between 6 and 13.

Furthermore, as an illustration, the ratio between the surface area of the surface S of each loop 44 of the group 46 and the surface area of the second surface S2 and the ratio between the surface area of the surface S of each loop of the group 46 and the surface area of the fourth surface S4 are each comprised between 3 and 8.

The width X1 of the first zone Z1 is equal to the width X3 of the third zone Z3. Furthermore, the length Y1 of the first zone Z1 is equal to the length Y3 of the third zone Z3.

More particularly, the width X1 of the first zone Z1 is equal to the width XC of the common zone of overlap ZC.

Furthermore, the width X3 of the third zone Z3 is also equal to the width XC of the common zone of overlap ZC.

The length Y1 of the first zone Z1 is equal to the second dimension YA of the first antenna $\mathbf{42}_1$ minus the length YC of the common zone of overlap ZC.

Furthermore, the length Y3 of the third zone Z3 is also equal to the length YA of the first antenna $\mathbf{42}_1$ minus the length YC of the common zone of overlap ZC.

The width X2 of the second zone Z2 is equal to the width X4 of the fourth zone Z4. Furthermore, the length Y2 of the second zone is equal to the length Y4 of the fourth zone Z4.

More precisely, the width X2 of the second zone Z2 is equal to the width XA of the first antenna $\mathbf{42}_1$ minus the width XC of the common zone of overlap ZC.

Furthermore, the width X4 of the fourth zone Z4 is also equal to the width XA of the first antenna $\mathbf{42}_1$ minus the width XC of the common zone of overlap ZC.

The length Y2 of the second zone Z2 is equal to the length YC of the common zone of overlap ZC. Furthermore, the length Y4 of the fourth zone Z4 is also equal to the length YC of the common zone of overlap ZC.

Furthermore, for each antenna 42 of the group 46 and each zone of overlap Z1, Z2, Z3, Z4 of two antennas 42, the ratio between the width XA of the antenna 42 and the width X1, X2, X3, X4 of the zone of overlap Z1, Z2, Z3, Z4 is strictly greater than 1.

In the example described, for each antenna 42 of the group 46 and each zone of overlap Z1, Z2, Z3, Z4 of two antennas 42, the ratio between the width XA of the antenna 42 and the width X1, X2, X3, X4 of the zone of overlap Z1, Z2, Z3, Z4 is comprised e.g. between 4 and 10 or between 1.1 and 1.5.

In the example described, the ratio between the width XA of each antenna 42 and the width X1 of the first zone Z1 and the ratio between the width XA of each antenna 42 and the width X2 of the third zone Z3 are each comprised between 4 and 10.

Furthermore, the ratio between the width XA of each antenna 42 and the width X2 of the second zone Z2 and the ratio between the width XA of each antenna 42 and the width X4 of the fourth zone Z4 are each comprised between 1.1 and 1.5.

In the example described, for each antenna 42 of the group 46 and each zone of overlap Z1, Z2, Z3, Z4 of two antennas, the ratio between the length YA of the antenna 42 and the length Y1, Y2, Y3, Y4 of the zone of overlap is strictly greater than 1.

In the example described, for each antenna 42 of the group 46 and each zone of overlap Z1, Z2, Z3, Z4 of two antennas, the ratio between the length YA of the antenna 42 and the length Y1, Y2, Y3, Y4 of the zone of overlap is comprised between 1.1 and 8.

As an example, the ratio between the length YA of each antenna 42 and the length Y1 of the first zone Z1 and the ratio between the length YA of each antenna 42 and the length Y3 of the third zone Z3 are each comprised between 1.1 and 2.5.

Furthermore, the ratio between the length YA of each antenna 42 and the length Y2 of the second zone Z2 and the ratio between the length YA of each antenna 42 of the group 46 and the length Y4 of the fourth zone Z4 are each comprised between 1.5 and 6.

Each communication zone (not shown in the figures) is associated with a distinct second communication unit 30.

Each communication zone associated with a second communication unit 30 is a three-dimensional zone of the compartment 22 wherein the second communication unit 30 is suitable for communicating with each associated first communication unit 15 when each first communication unit 30 is located within the zone communication. The second communication unit 30 is not apt to communicate with at least one first communication unit 15 when the first communication unit 15 is located outside the communication zone.

For each second communication unit 30, the communication zone is measured from the plane P1 wherein the antennas 42 of the second communication unit 30 extend along the vertical direction Z.

The height of the communication zone, denoted by H4, is greater than or equal to 50 centimeters.

For example, for each second communication unit 30, the electrical power supply is configured for supplying simultaneously the plurality of antennas 42 of the second communication unit 30.

According to one particular case, the power supply comprises an electric current generator.

Thereby, for each second communication unit 30, the electric current generator is configured for supplying simultaneously the plurality of antennas 42 of the second communication unit 30 with an electric current I.

A method of communication between a first communication unit 15 and a second communication unit 30 is described hereinafter in the present description.

The method comprises an initial step of supplying a current I to the antennas 42 of the second communication unit 30.

For example, during the initial step of supplying a current I, the antennas 42 of the plurality of antennas of the second communication unit 30 are simultaneously supplied with the current I.

As can be seen in FIG. 4, the current I flows counterclockwise for each loop 44 of each group 46.

For example, the value of the current I is comprised between 20 mA and 120 mA.

The method comprises a step wherein the antennas 42 are tuned.

The method comprises a step of emission of electromagnetic waves by the second communication unit 30.

The emission power of the second communication unit 30 is e.g. equal to 1.2 Watts.

The emission power is constant.

The second communication unit 30 emits a continuous electromagnetic field along the longitudinal direction Y (i.e. without reading gaps along the longitudinal direction Y).

The second communication unit 30 emits a continuous electromagnetic field along the transverse direction X (i.e. without reading gaps along the transverse direction X).

The three-dimensional zone of the internal compartment 22 receiving the electromagnetic waves emitted by the second communication unit 30 is called the "reception zone".

The communication zone is a part of the reception zone.

More particularly, in any plane delimited by the longitudinal direction Y and the vertical direction Z, the section of the communication zone is continuous, i.e. has no discontinuity. Furthermore, in any plane delimited by the transverse direction X and the vertical direction Z, the section of the communication zone is continuous, i.e. has no discontinuity.

The power of the electromagnetic field in the communication zone corresponds to a predefined power, denoted by $\Pi_1$.

As an example, the power of the electromagnetic field corresponds to the Poynting vector, to the square of the electrical component or to the square of the magnetic component of the electromagnetic field emitted by the second communication unit 30.

The preset power $\Pi_1$ is comprised, in absolute value, between 37 dBA/m and 47 dBA/m. The dBA/m unit is the magnetic field in Ampere per meter, on a decibel scale.

For example, the predefined power $\Pi_1$. is equal, in absolute value, to 37 dBA/m.

By using the second communication units 30, it is possible to read, without any reading gap, each associated first communication unit 15 along the transverse X and longitudinal Y directions The storage installation 10 comprising the storage system 20 is used for meeting the different requirements defined in the healthcare field for the storage of pouches. Indeed, the installation 10 provides flexibility in the positioning of the elements 12, i.e. the pouches, while ensuring a reliable reading of all the RFID labels 15 positioned on the pouches 12.

According to a variant of the storage device 20, each satellite box 29 is arranged between two consecutive racks 28.

In a variant, each satellite box 29 is arranged under a rack 28.

Furthermore, in such embodiment, each rack 28 is e.g. made of plastic.

The invention claimed is:

1. A wireless communication device comprising a plurality of antennas, each antenna having a single loop, the antennas of the plurality of antennas being arranged in groups of four antennas, the position of each antenna of the same group being deduced by translation from the position of another antenna of the same group, each group of four antennas including only five zones of overlap with antennas of the same group: a common zone of overlap with the four antennas and four zones of overlap with two antennas, wherein each superimposing zone of two antennas comprises a first dimension along the first direction and a second dimension along a second direction perpendicular to the first direction and wherein each antenna of the plurality of antennas has a first dimension along the first direction and a second dimension along the second direction (Y), the ratio between the first dimension of each antenna and the first dimension of each zone of overlap of two antennas being comprised between 1.1 and 1.5 or between 4 and 10 and the ratio between the second dimension of each antenna and the second dimension of each zone of overlap of two antennas being comprised between 1.1 and 8.

2. The wireless communication device according to claim 1, wherein each antenna of the plurality of antennas has a loop surface and wherein the common zone of overlap of each group has a surface, the ratio between the surface area of the loop surface of each antenna and the surface area of the surface of the common zone of overlap of each group being comprised between 20 and 35.

3. The wireless communication device according to claim 1, wherein each antenna of the plurality of antennas has a first dimension along a first direction and a second dimension along a second direction perpendicular to the first direction, wherein the common zone of overlap of each group comprises a first dimension along the first direction and a second dimension along the second direction, and wherein the ratio between the first dimension of each antenna and the first dimension of the zone of overlap common to each group is comprised between 4 and 10 and the ratio between the second dimension of each antenna and the second dimension of the common zone of overlap is comprised between 1.5 and 6.

4. The wireless communication device according to claim 1, wherein each group includes a first antenna, a second antenna, a third antenna and a fourth antenna and wherein the position of each antenna of a group is deduced by translation along a first direction of another antenna of the group.

5. The wireless communication device according to claim 1, wherein the antennas of the plurality of antennas are identical, the device comprising at least fifteen antennas.

6. The wireless communication device according to claim 1, wherein the wireless communication device is a radio identification label reader.

7. The wireless communication device according to claim 1, comprising an electric power generator configured for simultaneously supplying an electric current to the plurality of antennas of the communication device.

8. The wireless communication device according to claim 1, wherein the antennas of the plurality of antennas of the communication device are arranged in a plurality of groups of four antennas.

9. An installation for storing elements, each element supporting a first communication unit, the installation comprising:

a chamber comprising an internal compartment, and a storage device for elements comprising a wireless communication device according to claim 1, forming a second wireless communication unit apt to communicate with the first communication units, wherein the storage device for elements is arranged in the internal compartment.

10. The installation for storing elements according to claim 9, wherein the elements of the plurality of elements are containers of biological substances, medicines or therapeutic preparations and wherein each first wireless communication unit is a radio identification label comprising a memory suitable for storing data relating to the element supporting the first wireless communication unit.

11. A communication method implemented in an installation for storing elements according to claim 9 between at least a first wireless communication unit and a second wireless communication unit, wherein the communication method comprises a step of emitting waves by means of the second wireless communication unit.

12. The communication method according to claim 11, comprising supplying simultaneously, an electric current to the plurality of antennas of the second wireless communication unit.

13. The wireless communication device according to claim 1, wherein each superimposing zone of two antennas comprises a first dimension along the first direction and a second dimension along a second direction perpendicular to the first direction and wherein each antenna of the plurality of antennas has a first dimension along the first direction and a second dimension along the second direction, the ratio between the first dimension of each antenna and the first dimension of each zone of overlap of two antennas being comprised between 4 and 10 and the ratio between the second dimension of each antenna and the second dimension of each zone of overlap of two antennas being comprised between 1.1 and 8.

14. The wireless communication device according to claim 1, wherein each group includes a first antenna, a second antenna, a third antenna and a fourth antenna and wherein the position of each antenna of a group is deduced by translation along a second direction of the position of another antenna of the group, the second direction being perpendicular to a first direction.

15. The installation for storing elements according to claim 9, wherein the chamber is a refrigerating chamber.

16. An installation for storing elements, each element supporting a first communication unit, the installation comprising:

a chamber comprising an internal compartment, and a storage device for elements comprising a wireless communication device comprising a plurality of antennas, each antenna having a single loop, the antennas of the plurality of antennas being arranged in groups of four antennas, the position of each antenna of the same group being deduced by translation from the position of another antenna of the same group, each group of four antennas including only five zones of overlap with antennas of the same group: a common zone of overlap with the four antennas and four zones of overlap with two antennas, forming a second wireless communication unit apt to communicate with the first communication units, wherein the storage device for elements is arranged in the internal compartment.

17. The installation for storing elements according to claim 16, wherein the elements of the plurality of elements are containers of biological substances, medicines or therapeutic preparations and wherein each first wireless communication unit is a radio identification label comprising a memory suitable for storing data relating to the element supporting the first wireless communication unit.

18. A communication method implemented in an installation for storing elements according to claim 16 between at least a first wireless communication unit and a second wireless communication unit, wherein the communication method comprises a step of emitting waves by means of the second wireless communication unit.

19. The communication method according to claim 18, comprising supplying simultaneously, an electric current to the plurality of antennas of the second wireless communication unit.

20. The installation for storing elements according to claim 16, wherein the chamber is a refrigerating chamber.

21. A wireless communication device comprising a plurality of antennas, each antenna having a single loop, the antennas of the plurality of antennas being arranged in groups of four antennas, the position of each antenna of the same group being deduced by translation from the position of another antenna of the same group, each group of four antennas including only five zones of overlap with antennas of the same group: a common zone of overlap with the four antennas and four zones of overlap with two antennas, wherein each superimposing zone of two antennas comprises a first dimension along the first direction and a second dimension along a second direction perpendicular to the first direction and wherein each antenna of the plurality of antennas has a first dimension along the first direction and a second dimension along the second direction, the ratio between the first dimension of each antenna and the first dimension of each zone of overlap of two antennas being comprised between 4 and 10 and the ratio between the second dimension of each antenna and the second dimension of each zone of overlap of two antennas being comprised between 1.1 and 8.

* * * * *